United States Patent
Cunningham et al.

(10) Patent No.: US 12,058,198 B2
(45) Date of Patent: Aug. 6, 2024

(54) GONDOLA MONITORING SYSTEMS AND RELATED METHODS

(71) Applicant: G3 Enterprises, Inc., Modesto, CA (US)

(72) Inventors: John Cunningham, Tracy, CA (US); Miriam Torrison, Modesto, CA (US); Rebekah Wong, Modesto, CA (US)

(73) Assignee: G3 Enterprises, Inc., Modesto, CA (US)

( * ) Notice: Subject to any disclaimer, the term of this patent is extended or adjusted under 35 U.S.C. 154(b) by 387 days.

(21) Appl. No.: 17/473,213

(22) Filed: Sep. 13, 2021

(65) Prior Publication Data

US 2023/0084186 A1   Mar. 16, 2023

(51) Int. Cl.
| | | |
|---|---|---|
| *G06Q 50/02* | (2024.01) | |
| *G01D 9/00* | (2006.01) | |
| *G07C 5/00* | (2006.01) | |
| *G07C 5/08* | (2006.01) | |
| *H02J 7/00* | (2006.01) | |
| *H04L 67/025* | (2022.01) | |

(52) U.S. Cl.
CPC .......... *H04L 67/025* (2013.01); *G01D 9/007* (2021.05); *G06Q 50/02* (2013.01); *G07C 5/008* (2013.01); *G07C 5/0816* (2013.01); *H02J 7/0063* (2013.01); *B65D 2590/0083* (2013.01)

(58) Field of Classification Search
CPC ...... G01D 9/007; G07C 5/008; G07C 5/0816; B65D 2590/0083
See application file for complete search history.

(56) References Cited

U.S. PATENT DOCUMENTS

| | | | |
|---|---|---|---|
| 11,222,486 B1 | 1/2022 | Subramanian et al. | |
| 2019/0111984 A2 * | 4/2019 | Bean | G05B 19/4185 |
| 2020/0055553 A1 | 2/2020 | Raasch et al. | |
| 2021/0112318 A1 | 4/2021 | Troutman et al. | |
| 2021/0300674 A1 * | 9/2021 | Baur | B65D 90/022 |

OTHER PUBLICATIONS

International Search Report and Written Opinion for International Patent Application No. PCT/US2023/027657, dated Oct. 10, 2023 (8 Pages).
U.S. Appl. No. 17/869,199, filed Jul. 20, 2022, Gondola Monitoring Systems and Related Methods, Cunningham, et al.

* cited by examiner

*Primary Examiner* — Manuel A Rivera Vargas
(74) *Attorney, Agent, or Firm* — Goodwin Procter LLP

(57) ABSTRACT

Described herein are sensor systems and methods for monitoring a gondola configured to hold harvested produce and be transported by a trailer. The sensor system can include a capacity sensor configured to determine a remaining capacity of the gondola and a temperature sensor configured to monitor at least one of a temperature of the gondola or a temperature of the harvested produce held by the gondola. The sensor system can include a tilt sensor configured to monitor a tilt of the gondola and a trailer location sensor configured to determine a global position of the gondola. The sensor system can include a communication module in communication with the capacity sensor, the temperature sensor, the tilt sensor, and the trailer location sensor and can be configured to transmit data from the capacity sensor, the temperature sensor, the tilt sensor, and the trailer location sensor to a remote computing system.

21 Claims, 7 Drawing Sheets

GONDOLA MONITORING SYSTEMS AND RELATED METHODS

FIELD

The present disclosure relates to systems and methods for monitoring conditions of a gondola and, in particular, systems and methods for monitoring gondolas configured to hold harvested bulk produce that is transported on a trailer from fields to off-site storage and/or processing facilities.

BACKGROUND

During the harvest of a given crop (e.g., fruits, vegetables, nuts, etc.), produce may be picked from the field (e.g., mechanically or by hand) and loaded into gondolas. Gondolas, which can be open-top vessels, are configured to receive and contain bulk quantities of produce and are typically attached to and transported on a trailer from fields to off-site processing facilities. The size and geometry (e.g., high opaque walls) of a typical gondola can obscure visual monitoring by field personnel or equipment operators of gondola contents during filling. This is further exacerbated in cases where multiple gondolas are attached to a common trailer for transportation. Because a field worker or loader operator is generally not able to directly determine a level and distribution of produce in the gondola, the gondola may be filled improperly and/or weight imbalances can occur within or among the gondolas. Inaccessibility of the gondolas can also make monitoring other conditions of the gondolas and the produce contained therein difficult.

The foregoing discussion, including the description of motivations for some embodiments of the invention, is intended to assist the reader in understanding the present disclosure, is not admitted to be prior art, and does not in any way limit the scope of any of the claims.

SUMMARY

Described herein are sensor systems for monitoring conditions of a gondola (or other container or vessel) in which the gondola is configured to hold harvested produce (e.g., in bulk) and be transported on a trailer to a storage or processing facility. An example sensor system can include one or more capacity sensors configured to determine if the gondola contains produce and/or an available or remaining capacity of the gondola (e.g., a volume of additional or remaining storage available in the gondola). The example sensor system can include one or more temperature sensors configured to monitor a temperature of the gondola, a temperature of an environment in or around the gondola, and/or a temperature of harvested produce in the gondola. The example sensor system can include a tilt sensor configured to monitor a tilt of the gondola and a trailer location sensor configured to determine a global position of the gondola. The example sensor system include a communication module in communication with the capacity sensor, the temperature sensor, the tilt sensor, and/or the trailer location sensor and can be configured to transmit data from these sensors to a remote data storage and/or remote computing system.

Also described herein are methods for monitoring conditions of a gondola (or other container or vessel), in which the gondola is configured to hold harvested produce and be subsequently transported on a trailer to a storage or processing facility. An example method can include obtaining, via one or more capacity sensors, capacity data indicating a remaining capacity of the gondola (e.g., a remaining volume available for storage) and/or an amount of produce in the gondola. The method can include obtaining, via one or more temperature sensors, temperature data indicating a temperature of the gondola, a temperature of an environment in or around the gondola, and/or a temperature of the harvested produce in the gondola. The method can include obtaining, via a tilt sensor, tilt data indicating whether the gondola is tilting and obtaining, via a trailer location sensor, trailer location data indicating a global position of the gondola. The example method can include transmitting, via a communication module, the capacity data, the temperature data, the tilt data, and the trailer location data to a remote data storage and/or remote computing system. The communication module is in communication with the capacity sensor, the temperature sensor, the tilt sensor, and the trailer location sensor (e.g., by wired or wireless communications).

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
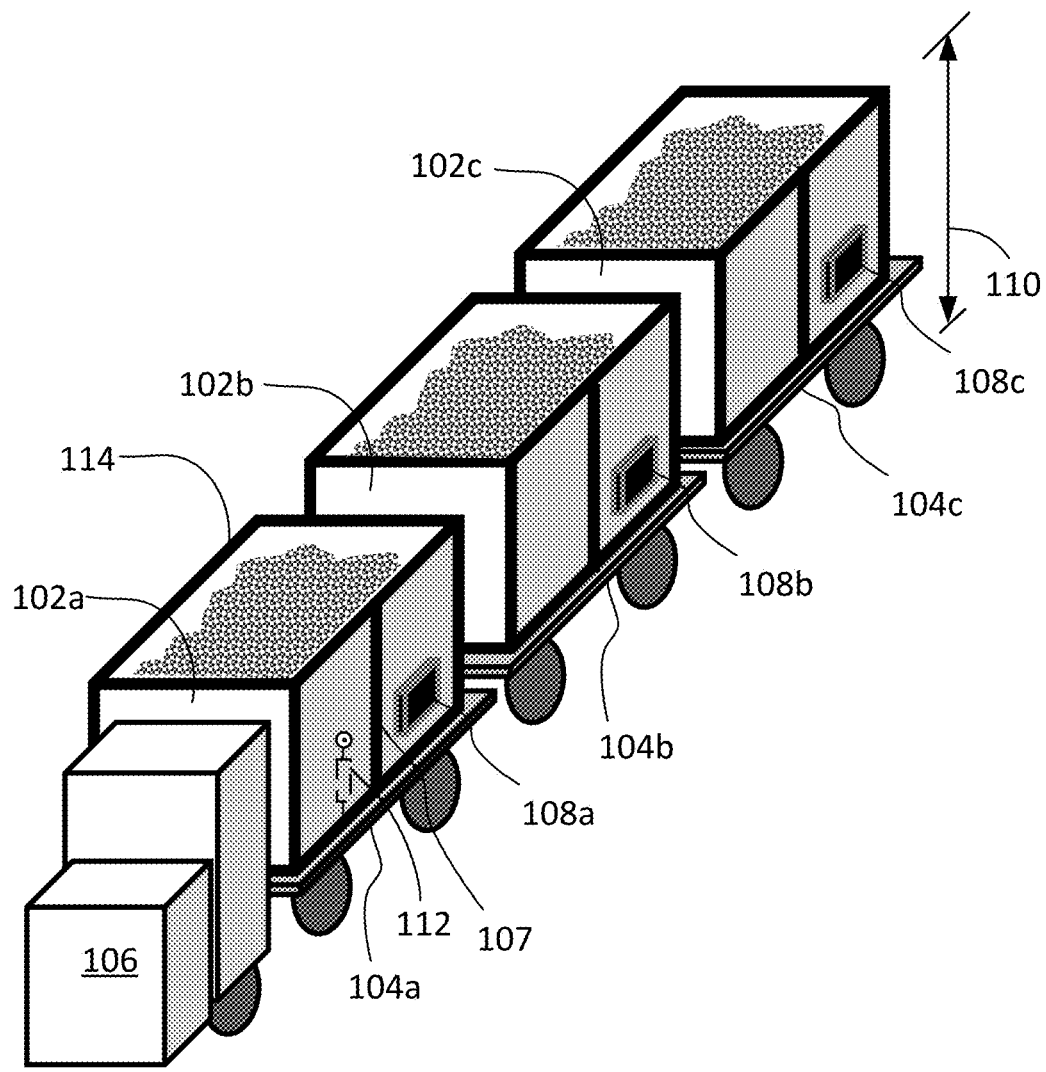
FIG. 1 is a schematic diagram of an example set of gondolas mounted on trailers configured for carrying harvested produce.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In certain examples, "capacity" can refer to a volume for storing or carrying produce or other items in a gondola or other container. For example, a "current capacity," "fill capacity," "fill level capacity," or "fill level" can refer to a current volume of produce held in the gondola. Likewise, in certain examples, "remaining capacity" or "available capacity" can refer to an additional volume available for storing or carrying produce or other items in the gondola or other container. For example, an empty gondola can have a remaining capacity that is equal to its entire capacity (e.g., an entire storage volume), while a gondola that is half full can have a remaining capacity that is equal to half of its entire capacity.

Systems and methods for monitoring conditions of gondolas are disclosed. In particular, the example systems and methods can be used to monitor gondolas used to hold bulk harvested produce. The gondolas may be monitored for capacity, temperature, tilt, geographic location, etc. Such monitoring may have one or more benefits. For example, by tracking the trailer location (e.g., global position) of the gondolas, the systems can be configured to ensure on-time delivery of produce by the gondolas to a destination. In another example, the systems can ensure that field workers or equipment operators (e.g., harvesters or loaders) are able to fill gondolas to capacity and have an adequate supply of gondolas, thereby saving valuable time in the field. Otherwise, field operations may be interrupted while additional gondolas are delivered from a different location. In another example, the monitoring of gondolas may be used to prevent injuries in the field due to field workers climbing gondolas to check the contents held therein. In another example, by dispatching gondolas to processors as soon as they are at maximum fill level capacity, the time that a gondola sits full near a vineyard or other field can be minimized, thereby preventing product damage and adverse quality impact due to excessive or unnecessary storage time prior to processing.

In another example, gondola and/or trailer utilization can be increased or maximized, thereby reducing costs for relocating empty trailers (especially during peak season). In yet another example, the gathering of gondola related data, including fill level capacity (e.g., during peak season) can reduce future capital purchases needed to meet harvest volume demands. In another example, the system can collect data to help determine how and/or where to allocate and/or position gondolas (e.g., across the state, within a region, etc.). In another example, some sensor data (e.g., temperature) may be used to monitor conditions that can impact produce quality. Monitoring gondola conditions on-site and in real-time can reduce and/or eliminate later testing in an off-site quality control laboratory (e.g., winery lab). As illustrated, GPS data (e.g., including date, time stamp, coordinates, etc.) used in combination with other sensor technologies can improve harvesting efficiencies and reduce cost.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Monitoring Gondolas

In general, gondolas are containers configured to hold bulk harvested produce and are typically transported on a trailer. The trailer may be hitched to a tractor or other truck power unit for movement among an open field or movement to and/or from a field (e.g., to an off-site storage warehouse or processor). Gondolas may be of varying shapes, sizes, capacities, weights, etc. The gondolas may be open, partially open, or closed on top. Gondolas may be made of various materials, e.g., a fiberglass container with a metal frame. FIG. 1 illustrates serially connected gondolas 102a, 102b, 102c (collectively referred to as 102) carried on respective trailers 104a, 104b, 104c (collectively referred to as 104). Note that, in some cases, two or more gondolas 102 may share a trailer 104. The trailers 104 are hitched to a tractor or other truck power unit 106 for transportation. As illustrated, each gondola 102 may include, be supported by, or be contained within a metal frame 107.

As described, after field harvesting, a portion of the produce (e.g., grapes) can be loaded into one of the gondolas (e.g., 102a). However, due to its size and opacity, it is generally not convenient or easy for a field worker or loader operator to determine which gondola was filled last or a current fill level of produce in a given gondola. An example gondola 102 and frame 107 may be 56 inches tall, 96 inches wide, and 139 inches in length. Trailer tire diameter may range from 16 to 22 inches. Therefore, for example, a top-side opening edge 114 of a gondola 102 may have a height 110 of six feet or more off the ground, making it difficult for the average person to look into. Therefore, a field worker may be forced to remember which gondola was filled last and/or climb up onto the trailer to see the contents of the gondola. Because most or all of the gondolas are similar in shape, size, and/or color, it is not simple to remember which gondola was filled last. Further, substantial time (e.g., several hours) may pass between instances when the gondolas were filled, which can make the task of remembering which one was filled last even more difficult. Additionally, it can be beneficial to balance the load in gondolas that are installed on one trailer. This can be important for transporting the gondolas efficiently and safely.

In various embodiments, each gondola may be monitored by a sensor system. In some embodiments, gondolas 102a, 102b, 102c have their own respective sensor systems 108a, 108b, 108c (collectively referred to as 108). In some embodiments, two or more gondolas 102 share a sensor system 108. As described further below, the sensor system 108 can be configured to monitor capacity (e.g., an available or remaining capacity), temperature, tilt, and/or trailer location associated with the gondolas 102*a*, 102*b*, 102*c*. In some embodiments, the sensor system 108 is positioned on the gondola so as to avoid drilling through the walls of the gondola or to avoid any component of the sensor system falling into the gondola. These undesirable attachment techniques may compromise the integrity of the gondola and/or the produce held inside. Further, it is beneficial for the sensor system 108 to be secured onto the gondola 102 to prevent any component of the sensor system 108 from falling during transit, thereby damaging the system 108 and/or causing harm to the gondola 102 or trailer 104 that runs over the system 108. In some embodiments, the sensor system 108 may be attached to the gondola 102 by adhesive. In some embodiments, the sensor system 108 may be attached to the metal frame 107 by mechanical fastener (e.g., zip tie, etc.).

Although the following description may focus on applications pertaining to produce (e.g., vegetables, fruit, nuts, etc.), the example systems and methods may be used for monitoring other containers or cargo. It is understood that the example systems and methods described herein may be used for or configured for other produce containers, shipping containers, cargo containers, trailers, etc. The example systems and methods may be used for agricultural purposes, non-agricultural purposes (e.g., for hauling dirt, gravel, sand, concrete, etc.), retail purposes, warehousing, etc.

Sensor Systems and Methods

Figure 2:
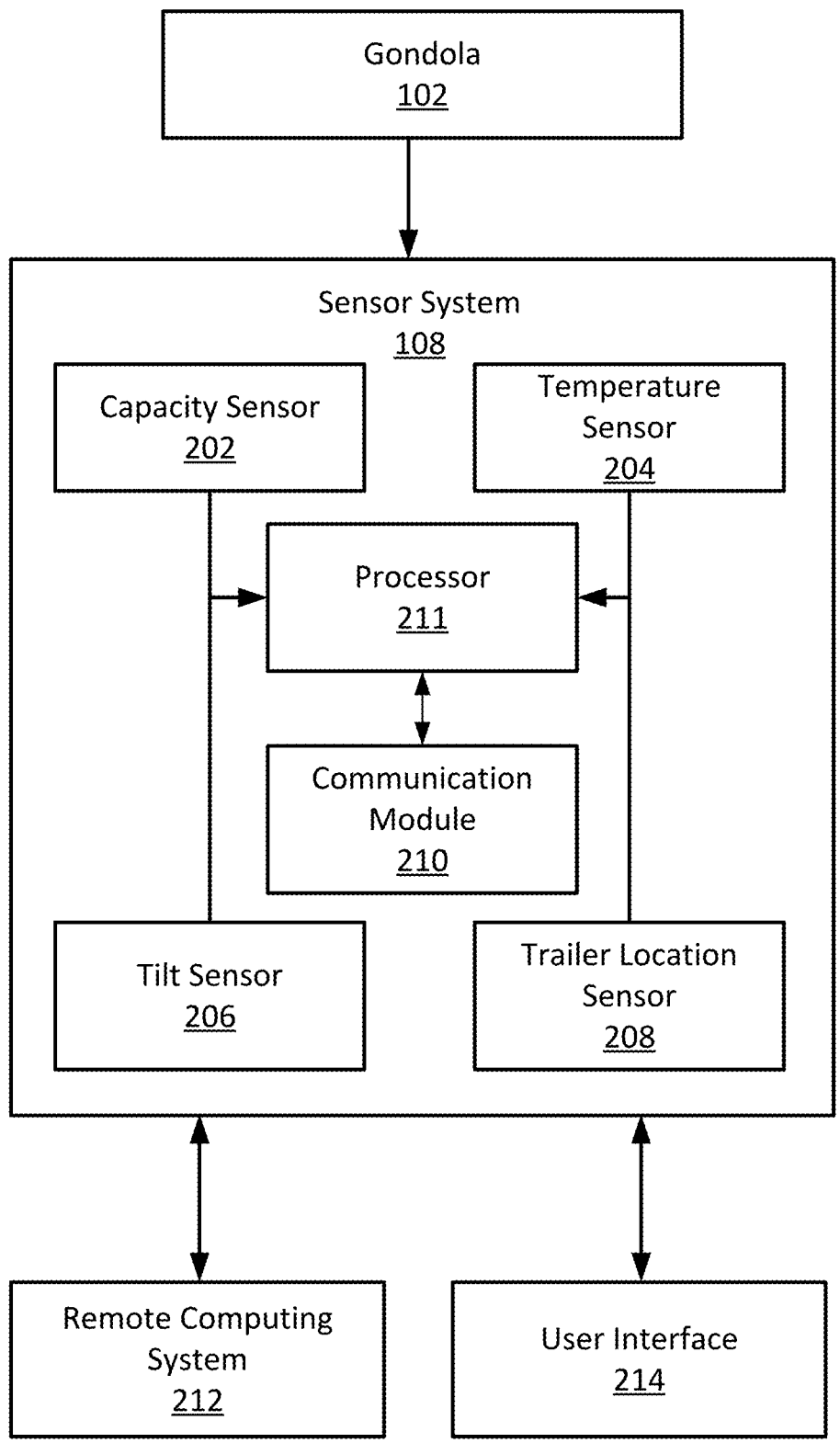
FIG. 2 is a schematic diagram of an example sensor system configured to monitor one or more gondolas.

FIG. 2 illustrates an example sensor system 108 for monitoring a gondola 102. The example sensor system 108 may include one or more capacity sensors 202 (e.g., to measure load presence, capacity of load, an amount of produce in the gondola 102, or a remaining capacity of the gondola 102), one or more temperature sensors 204, one or more tilt sensors 206, one or more trailer location sensors 208, and one or more communication modules 210. The sensors 202, 204, 206, 208 and communication module 210 can be coupled to a processor 211 (alternatively referred to herein as a processing module). In some embodiments, the processor 211 and communication module 210 are co-packaged or separately packaged. In some embodiments, the processor 211 and/or the communication module 210 are co-packaged with or separately packaged from the sensor system 108. The components of the sensor system 108 may be packaged in one or more housings. The housings may include various materials, e.g., plastic, metal, etc. For example, the housing may be a ruggedized plastic with metallic mounts. The housing may be water-resistant or water-proof.

The one or more capacity sensors 202 can be used to determine the available or remaining capacity of the gondola 102. Alternatively or additionally, the capacity sensors 202 can be used to determine a current capacity or fill level capacity of the gondola 102 (e.g., an amount of produce in the gondola 102). In some embodiments, the capacity sensors 202 can be or include a capacitive sensor mounted in or on a wall or floor of the gondola 102. The capacitive sensor can utilize capacitive sensing or capacitive coupling to detect or measure a presence of produce near the sensor. In one example, the capacitive sensor can be mounted in or near a hole or window of the gondola 102 and can be used to determine if the gondola 102 contains any produce near the hole or window. Multiple capacitive sensors can be installed in or around the gondola 102. For example, a side wall of the gondola 102 can have capacitive sensors installed at a variety of heights above the floor of the gondola 102 (e.g., separated by intervals of about 3, 6, or 12 inches). Signals from the capacitive sensors can be used to determine a height or fill level of the produce in the gondola 102. For example, the height can be determined by identifying the capacitive sensor that is highest above the floor and detecting the presence of produce. Additionally or alternatively, the one or more capacity sensors 202 can be or include a load cell or force-sensing resistor to measure produce quantities or capacities on an analog scale. For example, the capacity sensors 202 can be or include a force sensing resistor (FSR) sensor 112 (e.g., FlexiForce A401 made by TEKSCAN, Inc. of South Boston, Massachusetts, USA). The example resistor 112 may have a sensing area of approximately 1 in (25 mm) diameter or more. The resistor 112 can be installed (e.g., mounted, fastened, etc.) between the gondola 102 and metal frame 107. As the gondola 102 fills, increasing force is applied to the FSR 112, decreasing the electrical resistance in the sensor which is proportional to the force applied. The change in resistance can be used to determine the fill level (e.g., when density of fill material is known), weight, and/or remaining capacity of the respective gondola 102. Additionally or alternatively, in some examples, the capacity sensors 202 can be or include one or more sensors that directly sense gondola contents through the use of optical, laser, or similar techniques (e.g., a camera). Such sensors can peer through a hole or window in a wall of the gondola, and/or can view the contents over the top edge 114 of the gondola 102, to determine an amount of produce inside the gondola 102.

The temperature sensor 204 can be used to determine a temperature of an environment in or around the gondola 102 and/or a temperature of the contents (e.g., the produce) of the gondola 102. For example, a temperature sensor 204 may be configured to determine the temperature outside of the gondola 102 (e.g., an air temperature). Based on the determined outside temperature, the processor 211 can determine (e.g., derive) the temperature of the product inside the gondola 102 (e.g., using one or more predictive/analytic models). In some embodiments, the temperature sensor 204 can be or include a probe (e.g., an infrared thermometer) inside the gondola 102, or peering through a hole, window, or over the top edge 114 of the gondola 102, for monitoring the temperature inside the gondola 102 (e.g., of the produce).

In some embodiments, the tilt sensor 206 can be configured to determine a tilt angle of the gondola 102. The tilt sensor 206 can be beneficial to indicate when the gondola 102 is being emptied (e.g., by tilting the gondola 102 to empty its contents). Additionally or alternatively, this tilt information combined with the capacity sensor data can be used to automatically determine if the gondola contents have been transferred to the customer and/or to automatically produce an invoice with no human intervention. In some embodiments, the tilt sensor can determine whether and/or the degree to which the gondola 102 is tipping relative to the trailer 104 or the ground (e.g., not level or tilting to a side, front, or back). In some embodiments, the tilt sensor 206 includes an accelerometer, a force balance sensor, a microelectromechanical system (MEMS), a capacitive tilt sensor, and/or an electrolytic sensor. For example, the tilt sensor 206 can be or include a 3-axis accelerometer configured to sense movement and/or tilt in the x-, y-, and z-axes.

The trailer location sensor 208 can be configured to determine the geographic location of the gondola 102. For example, the trailer location sensor 208 can be configured to receive global position data from a satellite and/or a cellular phone tower.

Additionally or alternatively, in some examples, the sensor system 108 can include one or more other sensors to monitor other parameters associated with the gondola 102 or contents of the gondola 102. For example, the sensor system 108 can include a light sensor for monitoring exposure to sunlight. The light sensor can be used to determine, for example, a length of time (e.g., in minutes or hours) that produce in the gondola 102 has been exposed to direct sunlight. In some examples, the sensor system 108 can include a humidity sensor to measure humidity in or around the gondola 102 and/or a water sensor to detect moisture in the gondola 102 (e.g., due to rain).

In various implementations, the sensor system 108 can be used to monitor the quality of produce (e.g., grapes) in the gondola 102. For example, the temperature sensor 204, the light sensor, the humidity sensor, the water sensor, the capacity sensor 202, the tilt sensor 206, the trailer location sensor 208, a camera, an optical sensor (e.g., optical gas sensor such as an infrared laser-based gas sensor), a spectroscopy device (e.g., a laser photoacoustic spectroscopy device), a dielectric property sensor, a biosensor, and/or a chemical sensor can be used to monitor produce conditions over time and provide notifications or alerts to system operators when produce conditions or quality have deteriorated or are at risk of deteriorating. Such alerts can be generated, for example, when measurement data from the sensor system 108 indicates that conditions in or around the produce are or have been excessive. Excessive conditions can be determined based on one or more of the following: a temperature in or around the produce has been above or below a threshold value for a specified amount of time; the produce has been exposed to direct sunlight for more than a threshold amount of time; the produce has been exposed to high or low moisture levels for more than a threshold amount of time; a color of the produce has changed over time; the produce has been in the gondola for an excessive period of time; and/or a sensor detects the presence of fermentation in the produce. In response to the generated alerts, the system operators (e.g., gondola drivers) can take corrective action, such as moving the gondola 102 to a different location where the produce can be processed and/or where environmental conditions are less extreme.

The communication module 210 can be in communication with and receive data from the capacity sensor 202, temperature sensor 204, tilt sensor 206, and/or trailer location sensor 208. For example, the communication module 210 may receive data wirelessly or by wire from the sensors 202, 204, 206, and/or 208. The communication module 210 may transmit data from one or more of sensors 202, 204, 206, or 208 to a remote computing system 212. In some embodiments, the sensor system 108 may include or be coupled to a user interface 214 that accepts user input and/or displays information (e.g., sensor data).

Figure 3:
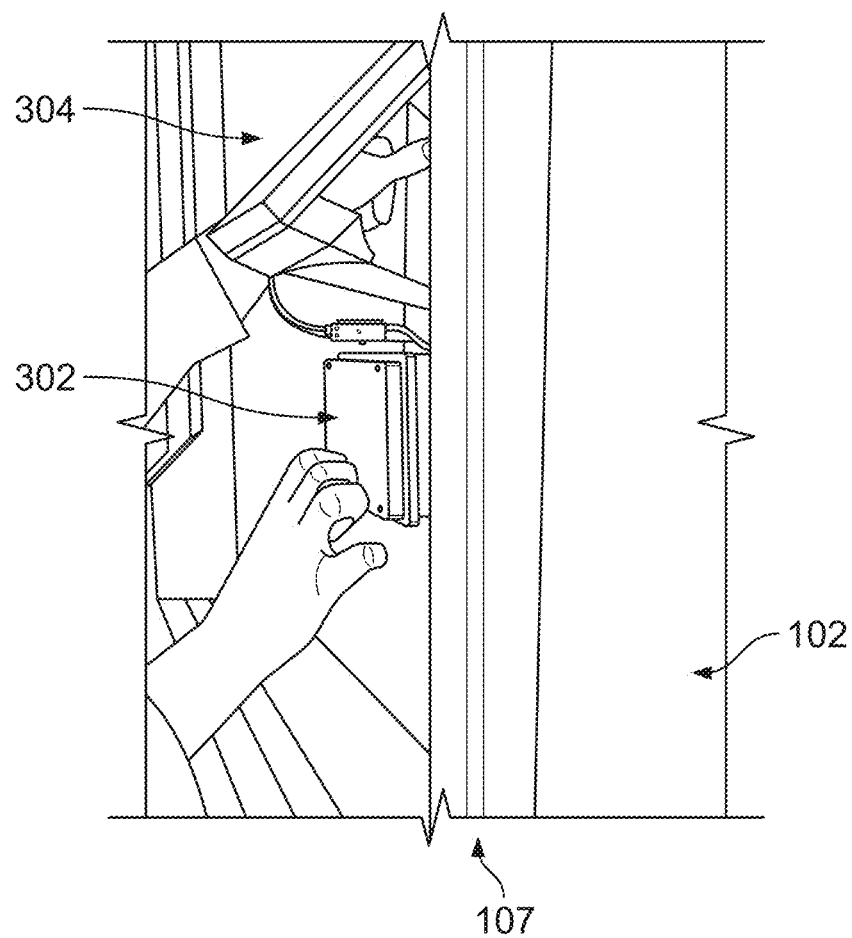
FIG. 3 is an image of a perspective view of an example sensor system attached to the side of a gondola.
Figure 4:
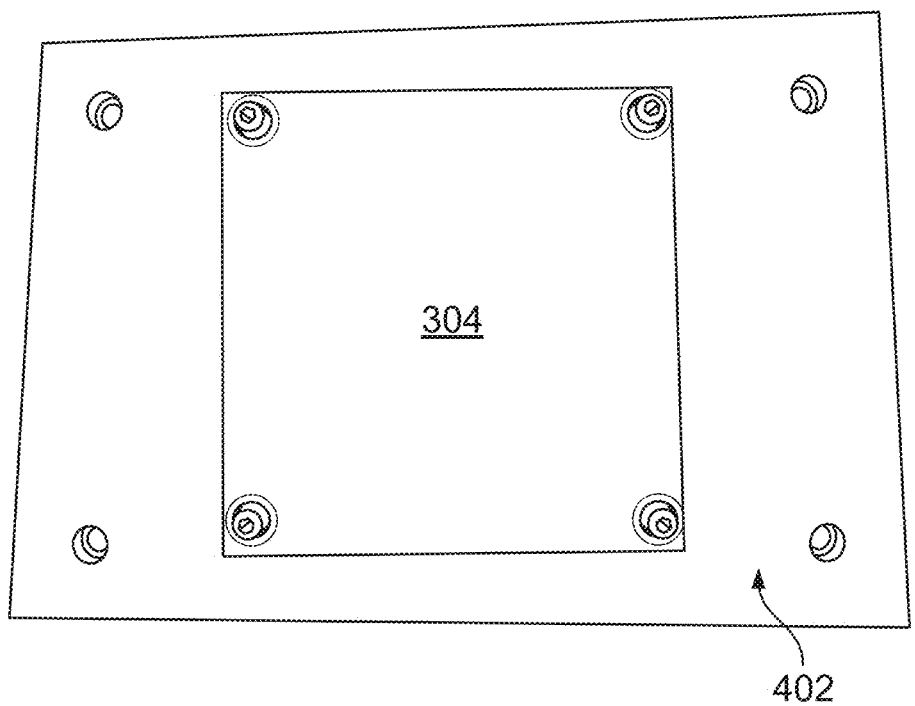
FIG. 4 is an image of a top view of an example sensor system for monitoring gondolas.

The sensor system 108 can derive power from a power source, e.g., a battery. In some embodiments, the battery may be coupled to a solar panel for charging purposes. FIG. 3 illustrates an example sensor system 108 in housing 302. The system 108 is connected to a solar panel 304, which is attached to an exterior side or wall of the gondola 102. In some cases, the solar panel 304 is attached to the housing 302 of the sensor system 108, as illustrated in FIG. 4 (in which the solar panel 304 obscures the housing 302 of the sensor system 108). The wiring of the solar panel 304 is directed through the lid of the housing 302 and is connected to the battery inside the housing 302. FIG. 4 also illustrates a fixture 402 (e.g., plate) for mounting the sensor system 108 and solar panel to the side of the gondola 102. For example, the fixture 402 can be mounted to the gondola 102 via screws, adhesive, ties, etc. In some cases, the solar panel 304 may be attached to the metal frame 107. In some implementations, the sensor system 108 and/or the battery can receive power from a truck, tractor, or other vehicle connected to the gondola 102. For example, in addition to or instead of receiving power from the solar panel 304, the sensor system 108 can receive power from a battery on the vehicle.

Figure 5A:
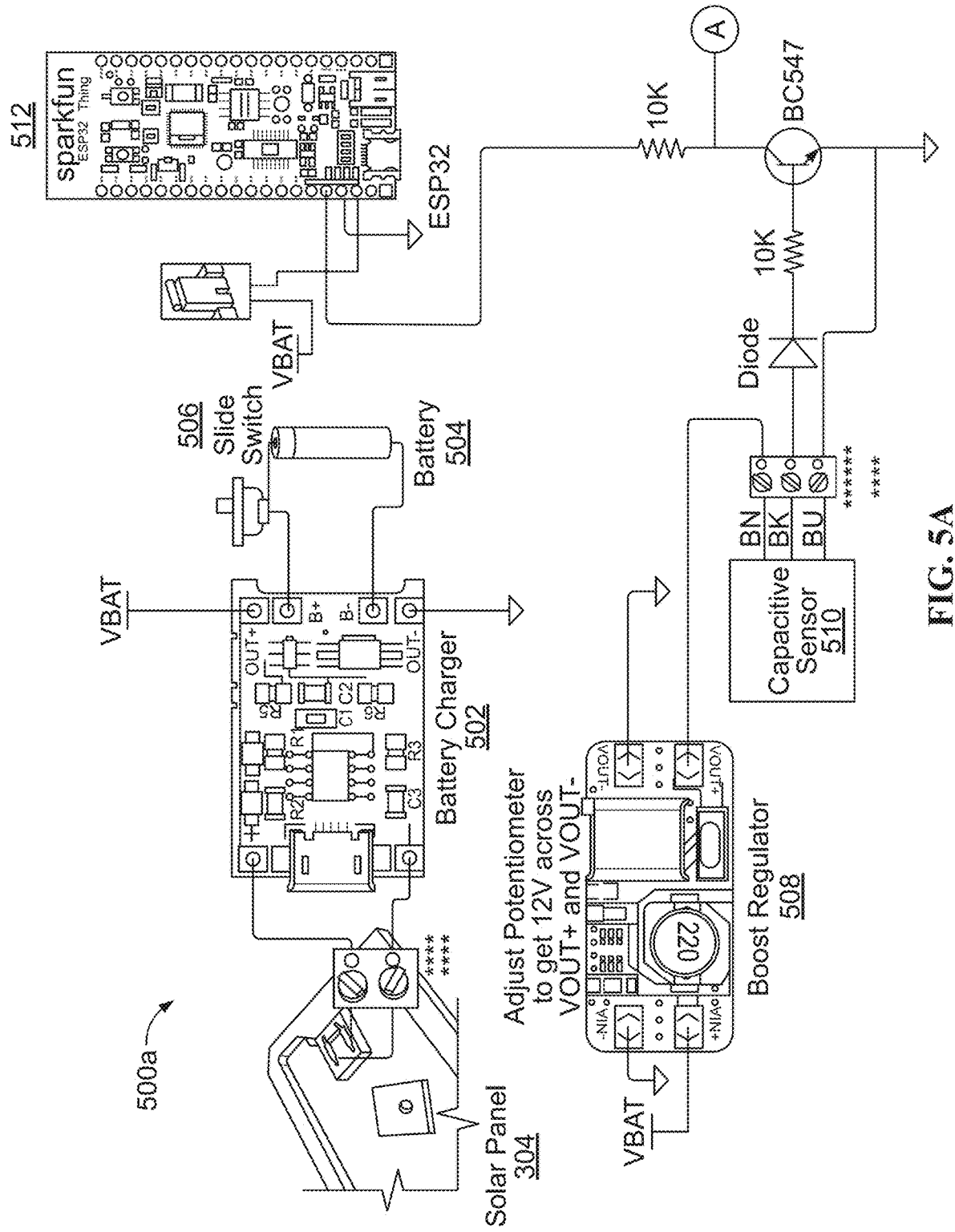
FIGS. 5A-5B are schematic diagrams of an example sensor system for monitoring gondolas.
Figure 5B:
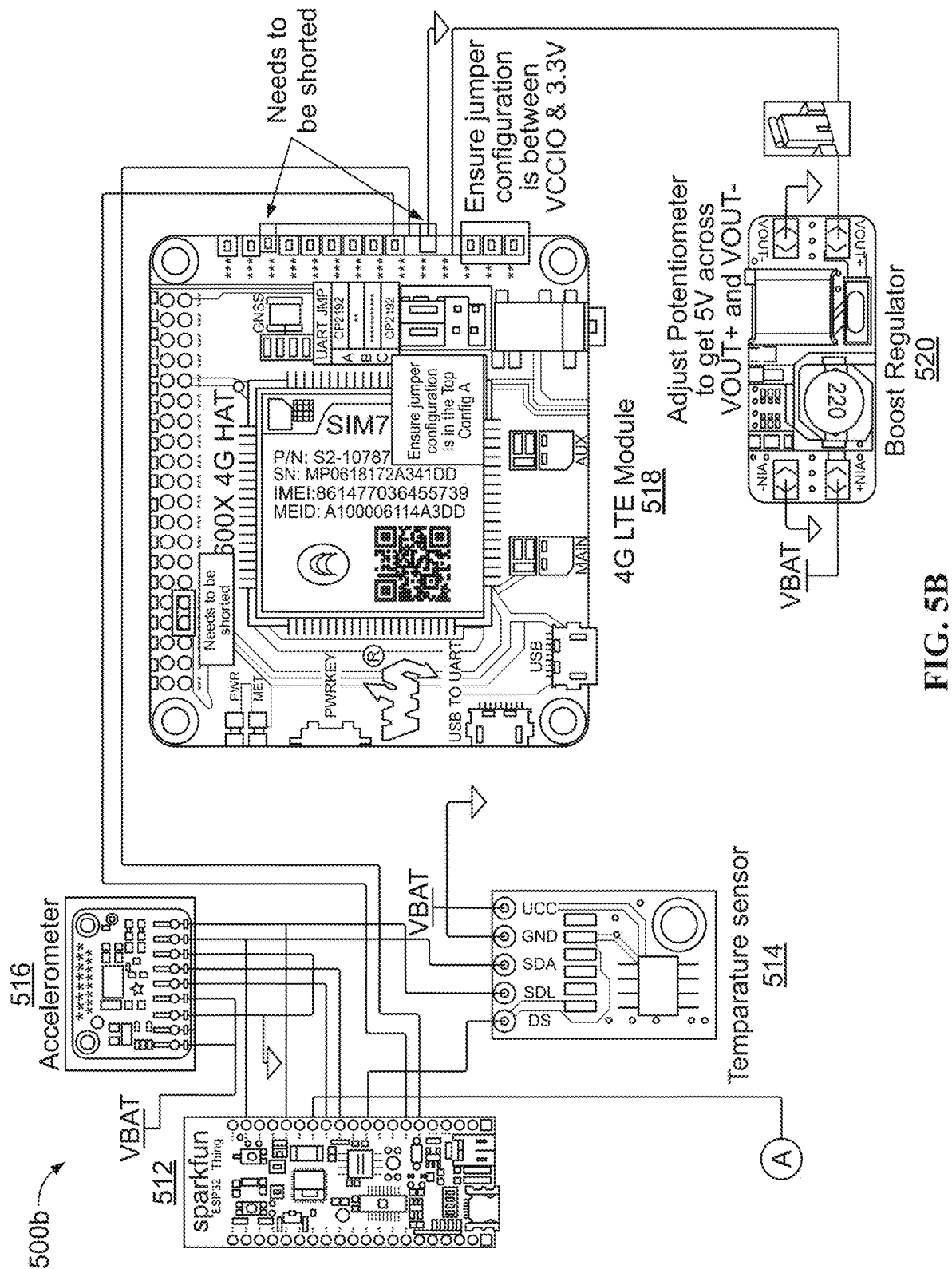

FIGS. 5A-5B show schematics 500a, 500b (collectively referred to as schematic 500) of the sensor system 108. Schematic 500a includes a solar panel 304 (e.g., 0.5 W 5V 100 mA Mini Small Solar Panel Module made by SUNNYTECH of San Jose, California, USA) electrically connected to a battery charger 502 (e.g., made by HILETGO TECHNOLOGY, Co., Ltd. of Shenzen, China) and battery 504 (e.g., a Lithium battery in a battery holder, e.g., Battery Holder 18650 made by HILETGO TECHNOLOGY, Co., Ltd.). The power to the sensor system 108 can be controlled by a user via slide or button switch 506. The battery 504 can power a boost regulator 508 (e.g., MT3608 DC-DC Boost Converter 2A made by XI'AN AEROSEMI TECHNOLOGY Co., Ltd. of Xi'an, China), which can include a potentiometer to adjust the voltage at its output. The boost regulator 508 can be connected to one or more capacity sensors, such as a capacitive sensor 510 (e.g., BCSS00TP Capacitive Level Sensor made by BALLUFF Inc. of Florence, Kentucky, USA) configured for fill level detection of produce through the side wall of the gondola 102. In some examples, the capacitive sensor 510 (alternatively referred to as a capacity sensor) is able to detect the fullness and/or current capacity of the gondola without contacting the interior of the gondola 102.

Referring still to FIG. 5A, the output of the capacitive sensor 510 is connected to the input of a communication module 512. This communication module 512 (e.g., HiLetgo ESP-WROOM-32 ESP32 ESP-32S Development Board 2.4 GHz made by HILETGO TECHNOLOGY, Co., Ltd. or SparkFun ESP32 Thing Development Board made by SPARKFUN ELECTRONICS of Niwot, Colorado, USA) can include a Wi-Fi module (configured to receive and/or transmit data over a Wi-Fi connection) and/or a Bluetooth module (configured to receive and/or transmit data over a Bluetooth connection).

Referring now to FIG. 5B, the same communication module 512 is connected to a temperature sensor 514 (e.g., COMIMARK LM75A Temperature Sensor High Speed I2C Interface Development Board Module) and accelerometer 516 (e.g., Digital Accelerometer ADXL345 Module made by SUNFOUNDER of Shenzen, China). The communication module 512 is connected further to a communication module 518 (e.g., 4G LTE module made by WAVESHARE ELECTRONICS of Shenzen, China) which includes a global positioning system (GPS). The communication module 518 is connected to a boost regulator 520. The communication module 518 can be configured to transmit the sensor data from the capacitive sensor 510 (or other capacity sensing systems), temperature sensor 514 and accelerometer 516 via cellular connection to a remote computing system (e.g., system 212, server system, cloud, etc.). The communication module 518 may also transmit GPS data associated with the sensor system 108. In some embodiments, the remote computing system 212 may retrieve the sensor data and/or GPS data from the communication module 518. The communication module 512 and/or the communication module 518 can be included in the communication module 210 described herein.

Sensor Data

Figure 6:
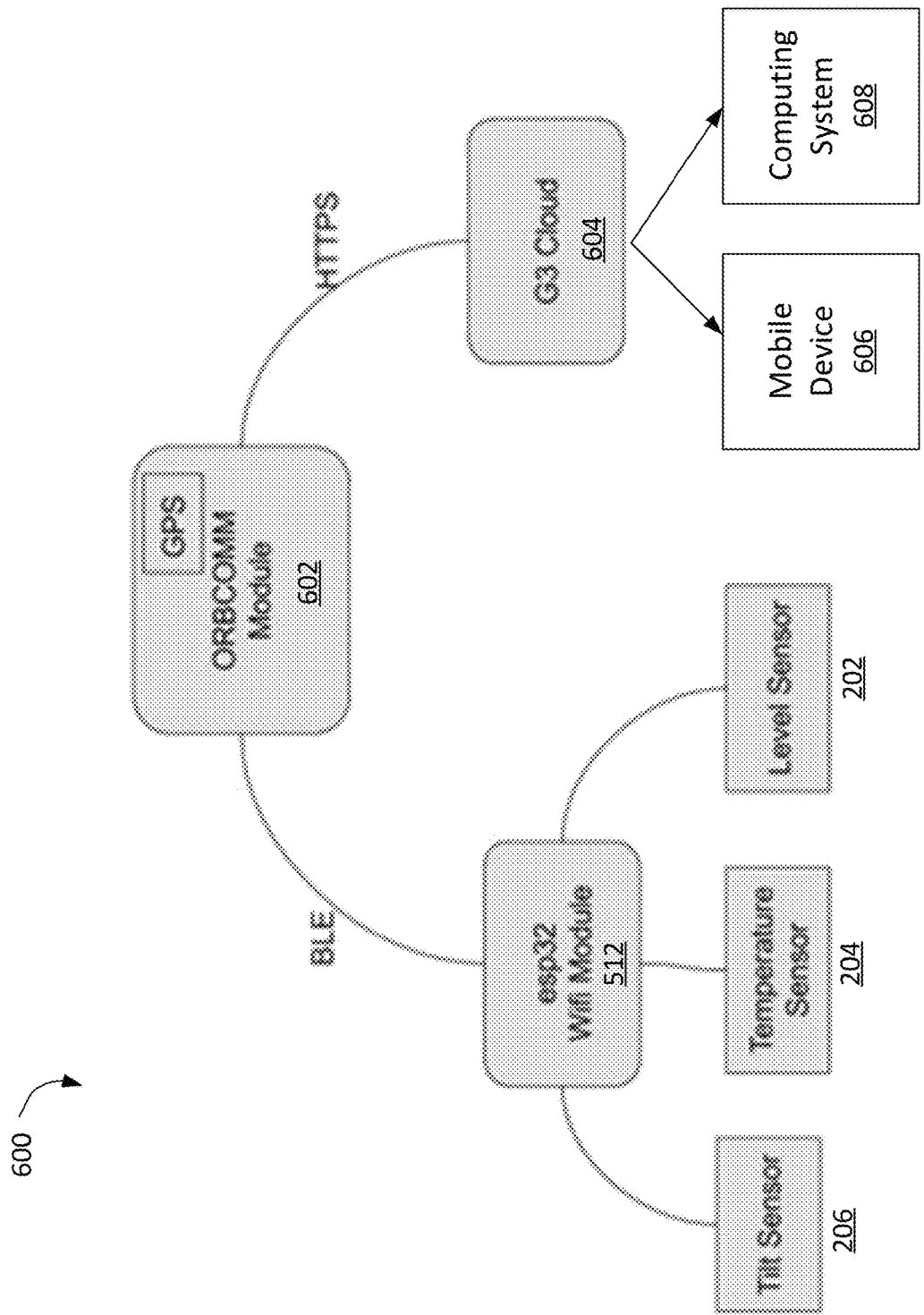
FIG. 6 is a schematic diagram of an example communication scheme for monitoring gondolas.

FIG. 6 is a diagram illustrating an example communication scheme 600 for the sensor system 108. The scheme 600 represents the capacity sensor 202, temperature sensor 204, and tilt sensor 206 that collect gondola fill level data, temperature data, and tilt data, respectively. The data can be provided to communication module 512 (e.g., Wi-Fi module and/or Bluetooth module). The communication module 512 can receive data from the sensors 202, 204, and 206. Such data can be received by the communication module 512 continuously, periodically (e.g., each second, minute, or hour), or upon request (e.g., on-demand). In some embodiments, the sensor data from sensors 202, 204, 206 may first be processed before being sent to the communication module 512 or be processed at a processor within the communication module 512. The communication module 512 may consolidate the sensor data into a single data packet (e.g., covering a given time period) and/or may use a separate processor (e.g., processor 211) for this task. The communication module 512 may transmit the data packet to a communication module 602 via a communication protocol, e.g., Bluetooth or Bluetooth LE. For example, the communication module 512 may send sensor data to the communication module 602 in the following string format (e.g., data sent as comma separated values):

{ID, temperature, x-axis acceleration, y-axis acceleration, z-axis acceleration, fill level, firmware version} where ID is the identification number or name assigned to the particular sensor system 108, temperature is the temperature data (e.g., in Celsius or Fahrenheit), x-axis acceleration is the acceleration data in the x-axis (indicative of tilt), y-axis acceleration is the acceleration data in the y-axis (indicative of tilt), z-axis acceleration is the acceleration data in the z-axis (indicative of tilt), level is the capacity and/or fill level data, and the firmware version is the current version of the firmware for operating the sensor system 108.

The communication module 602 may store the data packets received from module 512. The communication module 602 may include a GPS. The communication module 602 may be or include a GPS tracking device (e.g., made by ORBCOMM of Rochelle Park, New Jersey, USA) configured to remotely track and monitor certain assets. In some embodiments, the sensor system 108 is integrated with or includes the communication module 602, which may include or be the same as communication module 518.

In some embodiments, the communication module 602 is configured to send the sensor data from the capacity sensor 202 (e.g., capacitive sensor 510), temperature sensor 204 and/or tilt sensor (e.g., accelerometer 516) via an Internet connection (e.g., using a cellular network or a satellite communication) to a cloud network 604 or other computer network (e.g., the Internet), which may be or include remote computing system 212 (e.g., including a server system and one or more user client devices). The communication module 602 may also transmit the GPS data associated with the particular sensor system 108. In some embodiments, the cloud network 604 may retrieve the sensor data and/or GPS data from the communication module 602.

In some embodiments, one or more data of the sensor data and/or GPS data may be sent to and/or retrieved by a mobile device 606 and/or another computing system 608 via the cloud network 604. The mobile device 606 may be a user device, e.g., a smartphone, a smartwatch, a tablet, a laptop computer, a notebook computer, smart glasses, smart headset, etc. In some cases, the mobile device 606 may be part of or in close proximity to the sensor system 108, trailer 104, or truck 106. For example, a field worker or equipment loader operator who needs to know when gondola 102 is full (e.g., to stop filling the particular gondola or to fill the next gondola in the prescribed sequence) can access the data via a personal smartphone or a console system on truck 106. In another example, the sensor system 108 may display the data in user interface 214 for field workers who are physically present with the gondolas 102. In another example, the computing system 608 may be remote from the field where the gondolas 102 are utilized. This computing system 608 may use the sensor data to monitor the locations and/or movements of the gondolas 102 over one or more fields and/or to or from produce processing facilities. Advantageously, the computing system 608 can be used to manage gondola usage and locations, to ensure gondolas are being properly utilized and filled, and that produce is being handled properly and remains fresh while being stored and/or transported. In some embodiments, the computing system 608 may generate and push notifications or alerts related to the gondola or produce conditions (e.g., fill level, temperature, tilt, trailer location, etc.) to the mobile device 606.

In various instances, communications between system components may be limited or unable to take place when the sensor system 108 is located in a remote area, such as a remote agricultural field, where a connection to a cellular network, mobile network, or other network is limited or unavailable. For example, with no network connection, the communication module 602 may be unable to exchange data with the cloud network 604, or the cloud network 604 may be unable to exchange data with the mobile device 606 or computing system 608. In such instances, data can be stored until a suitable network connection is available and the data can be sent or retrieved. For example, the communication module 512 or a related storage device can store data when no network connection is available and then send the data to the cloud network 604 later, once a network connection has been established.

Hardware and Software Implementations

Figure 7:
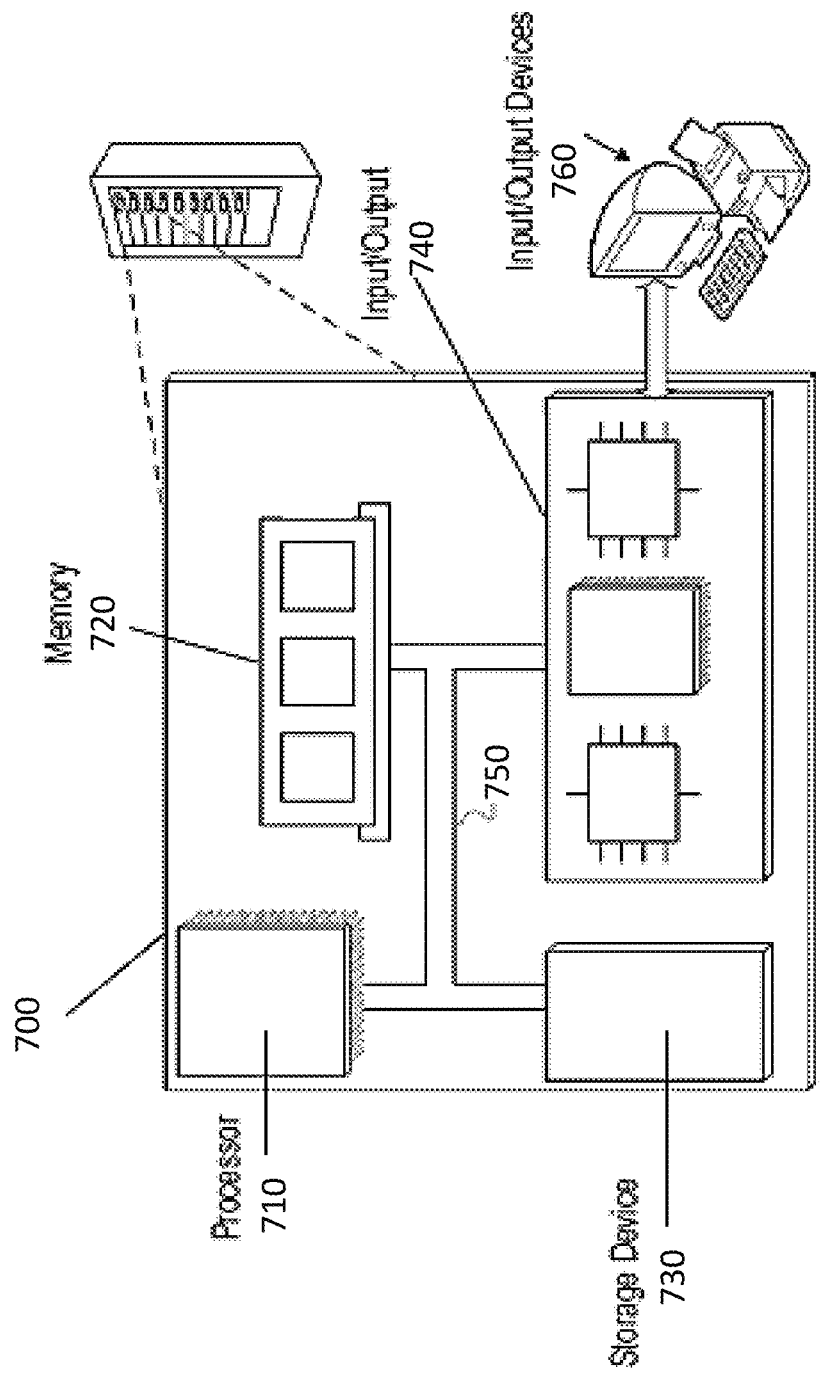
FIG. 7 is a schematic diagram of an exemplary hardware and software systems implementing the systems and methods described herein.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a nonvolatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A sensor system for monitoring conditions of a gondola configured to hold harvested produce and be transported by a trailer, the sensor system comprising:
   a capacity sensor configured to determine a remaining capacity of the gondola;
   a temperature sensor configured to monitor at least one of a temperature of the gondola, a temperature of an environment around the gondola, or a temperature of the harvested produce held by the gondola;
   a tilt sensor configured to monitor a tilt of the gondola;
   a trailer location sensor configured to determine a global position of the gondola; and
   a communication module in communication with the capacity sensor, the temperature sensor, the tilt sensor, and the trailer location sensor and configured to transmit data from the capacity sensor, the temperature sensor, the tilt sensor, and the trailer location sensor to a remote computing system,
   wherein the sensor system is configured to monitor gondolas constructed of opaque material and having an opening edge at least six feet from a ground level.

2. The sensor system of claim 1, further comprising:
   a housing configured to at least partially enclose one or more of the capacity sensor, the temperature sensor, the tilt sensor, the trailer location sensor, or the communication module,
   wherein the housing is configured to be mounted to at least one of an exterior surface of the gondola or a frame supporting the gondola.

3. The sensor system of claim 2, wherein the housing is mounted to the exterior surface of the gondola using at least one of an adhesive or a mechanical fastener.

4. The sensor system of claim 2, wherein the capacity sensor comprises a force-sensing resistor configured to be disposed between the gondola and the frame and configured to measure a weight of the gondola.

5. The sensor system of claim 1, further comprising a processing module configured to process data from at least one of the capacity sensor, the temperature sensor, and the tilt sensor.

6. The sensor system of claim 5, wherein the communication module is configured to receive data packets from the processing module and transmit data to the remote computing system.

7. The sensor system of claim 6, wherein the remote computing system comprises a client device of a user.

8. The sensor system of claim 1, further comprising:
   a battery configured to provide energy to one or more of the capacity sensor, the temperature sensor, the tilt sensor, the trailer location sensor, or the communication module.

9. The sensor system of claim 8, further comprising:
   a solar panel configured to charge the battery.

10. The sensor system of claim 1, wherein the tilt sensor comprises at least one of an accelerometer, a force balance sensor, a microelectromechanical system (MEMS), a capacitive tilt sensor, or an electrolytic sensor.

11. The sensor system of claim 1, wherein the trailer location sensor is configured to receive global position data from at least one of a satellite or a cellular phone tower.

12. The sensor system of claim 1, wherein the communication module is configured to transmit data from the capacity sensor, the temperature sensor, the tilt sensor, and the trailer location sensor to the remote computing system using a cellular network or a satellite communication.

13. The sensor system of claim 1, wherein the capacity sensor comprises a capacitive sensor.

14. The sensor system of claim 1, wherein the remote computing system comprises a cloud network.

15. The sensor system of claim 1, wherein the sensor system is configured to monitor a quality of the harvested produce and generate an alert when the quality has deteriorated or is at risk of deteriorating.

16. A method for monitoring a gondola configured to hold harvested produce and be transported by a trailer, the method comprising:
   obtaining, via a capacity sensor, capacity data indicating a remaining capacity of the gondola;
   obtaining, via a temperature sensor, temperature data indicating at least one of a temperature of the gondola, a temperature of an environment around the gondola, or a temperature of the harvested produce held by the gondola;
   obtaining, via a tilt sensor, tilt data indicating whether the gondola is tilting;
   obtaining, via a trailer location sensor, trailer location data indicating a global position of the gondola;
   transmitting, via a communication module, the capacity data, the temperature data, the tilt data, and the trailer location data to a remote computing system, wherein the communication module is in communication with the capacity sensor, the temperature sensor, the tilt sensor, and the trailer location sensor,
   wherein the sensor system is configured to monitor gondolas constructed of opaque material and having an opening edge at least six feet from a ground level.

17. The method of claim 16, wherein the capacity sensor comprises a force-sensing resistor configured to be installed between the gondola and the frame and the capacity data indicates a weight of the harvested produce in the gondola.

18. The method of claim 16, further comprising:
   receiving, by the trailer location sensor, global position data associated with the gondola from at least one of a satellite or a cellular phone tower.

19. The method of claim 16, further comprising:
generating, by a processing module coupled to the communication module, a data packet comprising the capacity data, the temperature data, and the tilt data.

20. The method of claim 16, wherein the transmitting the capacity data, the temperature data, the tilt data, and the trailer location data to the remote computing system is over a cellular network or a satellite communication.

21. The method of claim 16, further comprising:
monitoring a quality of the harvested produce; and
generating an alert when the quality has deteriorated or is at risk of deteriorating.

* * * * *